(12) United States Patent
Lee et al.

(10) Patent No.: US 11,092,806 B2
(45) Date of Patent: Aug. 17, 2021

(54) APPARATUS AND METHOD OF DISPLAYING IMAGE AND COMPUTER PROGRAM THEREOF

(71) Applicant: SAMSUNG ELECTRONICS CO., LTD., Suwon-si (KR)

(72) Inventors: Wonjun Lee, Suwon-si (KR); Kyusub Kwak, Suwon-si (KR); Kyookeun Lee, Suwon-si (KR); Myongjo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/718,387

(22) Filed: Dec. 18, 2019

(65) Prior Publication Data
US 2020/0192092 A1 Jun. 18, 2020

(30) Foreign Application Priority Data
Dec. 18, 2018 (KR) .......................... 10-2018-0164312

(51) Int. Cl.
*G02B 27/01* (2006.01)
(52) U.S. Cl.
CPC .... *G02B 27/0101* (2013.01); *G02B 2027/014* (2013.01)
(58) Field of Classification Search
CPC ............ G02B 27/0101; G02B 27/0103; G02B 27/014; G02B 2027/0105; G02B 2027/0112; G02B 2027/0116
USPC .......................................................... 385/37
See application file for complete search history.

(56) References Cited

U.S. PATENT DOCUMENTS

| 7,206,107 | B2 | 4/2007 | Levola |
| 8,643,948 | B2 | 2/2014 | Amitai et al. |
| 8,885,997 | B2* | 11/2014 | Nguyen .............. G02B 5/1814 385/37 |
| 9,494,799 | B2 | 11/2016 | Robbins et al. |
| 10,750,145 | B1* | 8/2020 | Shipton ............. G02B 27/4272 |
| 2004/0174348 | A1* | 9/2004 | David ................ G02B 27/0103 345/204 |

(Continued)

FOREIGN PATENT DOCUMENTS

| JP | 6171740 B2 | 8/2017 |
| WO | 2018102834 A2 | 6/2018 |

OTHER PUBLICATIONS

International Search Report (PCT/ISA/210) and Written Opinion (PCT/ISA/237) dated Mar. 25, 2020 from the International Searching Authority in application No. PCT/KR2019/017684.

*Primary Examiner* — Robert Tavlykaev
(74) *Attorney, Agent, or Firm* — Sughrue Mion, PLLC

(57) ABSTRACT

An image display apparatus includes a first waveguide, a second waveguide positioned at one side of the first waveguide, a first diffraction grating positioned at an other side of the first waveguide, a second diffraction grating positioned between the first waveguide and the second waveguide and a display engine configured to control a shape of the second diffraction grating according to a quantity of light diffracted from the first diffraction grating, wherein at least a portion of light incident on the first waveguide is diffracted from the first diffraction grating, and at least a portion of light incident on the second waveguide, is diffracted from the second diffraction grating.

15 Claims, 9 Drawing Sheets

(56) References Cited

U.S. PATENT DOCUMENTS

| | | | |
|---|---|---|---|
| 2010/0177388 A1* | 7/2010 | Cohen | G02B 27/0081 |
| | | | 359/566 |
| 2014/0300966 A1* | 10/2014 | Travers | G03H 1/2205 |
| | | | 359/558 |
| 2017/0235144 A1* | 8/2017 | Piskunov | G02B 5/32 |
| | | | 359/13 |
| 2018/0143438 A1* | 5/2018 | Oh | G02B 6/0016 |
| 2018/0231702 A1 | 8/2018 | Lin et al. | |
| 2018/0252857 A1* | 9/2018 | Glik | G02B 27/0172 |
| 2019/0121126 A1* | 4/2019 | Simmonds | G02B 6/005 |
| 2020/0026074 A1* | 1/2020 | Waldern | G02B 27/0093 |
| 2020/0166756 A1* | 5/2020 | DeLapp | G02B 5/32 |

* cited by examiner

APPARATUS AND METHOD OF DISPLAYING IMAGE AND COMPUTER PROGRAM THEREOF

CROSS-REFERENCE TO RELATED APPLICATION

This application is based on and claims priority under 35 U.S.C. § 119 to Korean Patent Application No. 10-2018-0164312, filed on Dec. 18, 2018, in the Korean Intellectual Property Office, the disclosure of which is incorporated by reference herein in its entirety.

BACKGROUND

1. Field

The disclosure relates to an apparatus for displaying images, a method of displaying images, and a computer program product including a recording medium storing a program for performing the method of displaying images.

2. Description of Related Art

Augmented Reality (AR) technology is technology for synthesizing a virtual object or information with a real environment such that the virtual object or information looks like a real object existing in the real environment. Recent computing and display technology has enabled the development of systems for AR experiences. In the AR experiences, digitally generated images or portions of the images are provided to a user in such a way that they look real or such that the user can recognize them as reality.

With the growing interest in AR technology, various technology for embodying AR is being actively developed. Particularly, studies into near eye display technology for displaying images that are projected directly onto a user's retinas are being conducted.

SUMMARY

Additional aspects will be set forth in part in the description which follows and, in part, will be apparent from the description, or may be learned by practice of the presented embodiments of the disclosure.

In accordance with an aspect of the disclosure, an image display apparatus includes a first waveguide; a second waveguide positioned at one side of the first waveguide; a first diffraction grating positioned at an other side of the first waveguide; a second diffraction grating positioned between the first waveguide and the second waveguide; and a display engine configured to control a shape of the second diffraction grating according to a quantity of light diffracted from the first diffraction grating, wherein at least a portion of light incident on the first waveguide is diffracted from the first diffraction grating, and at least a portion of light incident on the second waveguide, is diffracted from the second diffraction grating.

The processor may be further configured to identify a quantity of light diffracted from the first diffraction grating; obtain information regarding a shape of the second diffraction grating for compensating for the quantity of light diffracted from the first diffraction grating such that a total quantity of light diffracted from the first waveguide and the second waveguide is uniform, and apply, to the second diffraction grating, an electrical signal based on the obtained information regarding the shape of the second diffraction grating.

Information regarding at least one from among a pattern or a length of the second diffraction grating may be obtained according to the quantity of the light diffracted from the first diffraction grating.

The second diffraction grating may include at least one from among a liquid crystal (LC) plate, an LC lens, and an active diffracting device.

The image display apparatus may further include an optical path controller wherein quantity of the light incident on first waveguide and second waveguide is controlled through the optical path controller and the optical path controller includes at least one from among a half mirror, a full mirror, or a liquid crystal lens.

The processor may be further configured to obtain information regarding a color of light from a real-world image incident on the image display apparatus; and control a shape of the second diffraction grating according to the information regarding the color and the quantity of the light diffracted from the first diffraction grating.

The image display apparatus may be further comprise a third waveguide on which a third diffraction grating is positioned and a fourth waveguide on which a fourth diffraction grating is positioned, wherein light formed from at least one image signal from among a red (R) image signal, a green (G) image signal, and a blue (B) image signal constituting a virtual image is selectively diffracted from the first diffraction grating and the second diffraction grating, light formed from an image signal other than the at least one image signal from among the R image signal, the G image signal, and the B image signal is diffracted from the third diffraction grating, and information regarding a shape of the fourth diffraction grating is obtained according to characteristics of light diffracted from the third diffraction grating.

The processor may be further configured to identify an application that is being executed in the image display apparatus, and control the shape of the second diffraction grating according to the determined application and the quantity of the light diffracted from the first diffraction grating.

In accordance with an aspect of the disclosure, an image display method includes obtaining information regarding a quantity of light diffracted from a first diffraction grating; obtaining information regarding a shape of a second diffraction grating for controlling a quantity of light diffracted from the second diffraction grating, based on the information regarding the quantity of the light, diffracted from a first diffraction grating, wherein the first diffraction grating is positioned at an other side of the first waveguide and the second diffraction grating positioned between the first waveguide and a second waveguide; applying, to the second diffraction grating, an electrical signal based on the information regarding the shape of the second diffraction grating; and outputting light constituting a virtual image to the first waveguide and the second waveguide, respectively.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
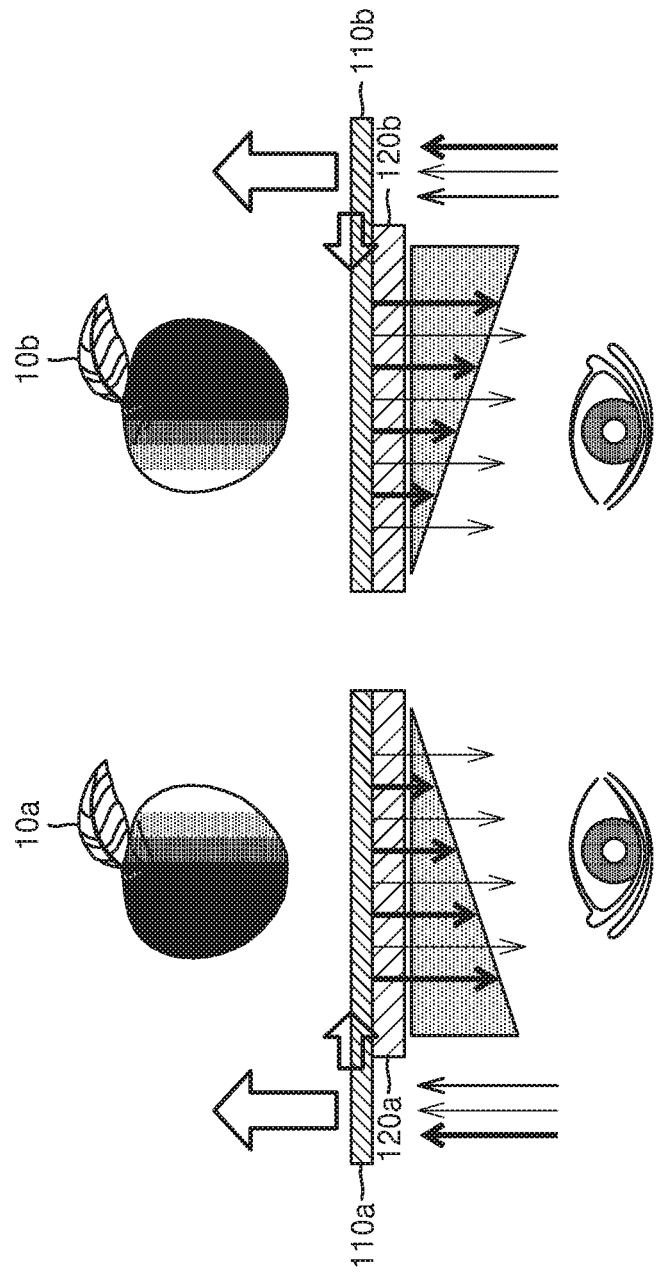
FIG. 1 is a view for describing the characteristics of light diffracted by diffraction gratings positioned on waveguides according to an embodiment.

Terms used in this specification will be briefly described, and the disclosure will be described in detail.

The terminology used in the disclosure was selected in consideration of the disclosed functions. The meaning of such terms may vary according to intentions of one of ordinary skill in the art, judicial precedents, the advent of new technologies, and the like. Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the disclosure. As used herein, the term "and/or" includes any and all combinations of one or more of associated listed items.

Also, it will be understood that when the terms "includes," "comprises," "including," and/or "comprising," when used in this specification, specify the presence of a stated component, but do not preclude the presence or addition of one or more other components. The term "portion" means a software or hardware component such as a Field Programmable Gate Array (FPGA) or an Application Specific Integrated Circuit (ASIC), and the "portions" each perform assigned functions. However, the "portions" are not limited to software or hardware. The "portions" may be configured in an addressable storage medium, or may be configured to run on at least one processor. Therefore, as an example, the "portions" include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the "portions" may be combined into fewer components and/or "portions" may be separated into additional components and "portions".

Hereinafter, embodiments of the disclosure will be described in detail with reference to the accompanying drawings so that the disclosure may be readily implemented by those of skill in the art. However, the disclosure is not restricted by these embodiments but can be implemented in many different forms. Also, in the drawings, parts irrelevant to the description are omitted for the simplicity of explanation, and like reference numerals will refer to like components throughout this specification.

Throughout the disclosure, the expression "at least one of a, b or c" indicates only a, only b, only c, both a and b, both a and c, both b and c, all of a, b, and c, or variations thereof.

FIG. 1 is a view for describing the characteristics of light diffracted by a plurality of diffraction gratings 120a and 120b positioned on a plurality of waveguides 110a and 110b.

Referring to FIG. 1, light may be irradiated to the waveguides 110a and 110b on which the diffraction gratings 120a and 120b are positioned, so that the light may be sensed by a user's left and right eyes, respectively. The light may be formed from a red (R) image signal, a green (G) image signal, and a blue (B) image signal constituting a virtual image.

Meanwhile, at least a part of the light irradiated to the waveguides 110a and 110b may be diffracted by the diffraction gratings 120a and 120b, and the remaining part of the light may be projected away from the user's eyes. A quantity (i.e., an amount) of the diffracted light may vary within each of the diffraction gratings 120a and 120b. For example, an area (i.e., a region) of a diffraction grating located more distant from a location from which light is irradiated may diffract a smaller quantity of light than another area of the diffraction grating that is closer to the location from which light is irradiated.

Referring to FIG. 1, a phenomenon in which a quantity of diffracted light is reduced will be described by using, for example, a case in which light formed respectively from an R image signal, a G image signal, and a B image signal constituting a virtual image including an apple is incident to the wave guides 110a and 110b. In the current embodiment, it is assumed that the diffraction gratings 120a and 120b selectively diffract the light formed respectively from the R image signal and the G image signal. The quantity of light diffracted by the diffraction gratings 120a and 120b may decrease as a distance from a point of incidence of the light upon the corresponding waveguide increases. Particularly, as shown in FIG. 1, in the case of the waveguides 110a and 110b according to the current embodiment, it may be confirmed that the quantity of light formed from the R signal depends greatly on an area at which the light is diffracted.

As the quantity of light diffracted by the diffraction gratings 120a and 120b depends greatly on the areas of the diffraction gratings 120a and 120b at which the light is diffracted, a red color of apple images 10a and 10b recognized by the user's left and right eyes may be non-uniform. Therefore, an image display apparatus for controlling diffraction gratings to emit light forming virtual images of a uniform color on a user's retinas is needed. Hereinafter, a method of controlling diffraction gratings to emit light forming virtual images of a uniform color, according to an embodiment, will be described with reference to FIGS. 2 to 11.

Figure 2:
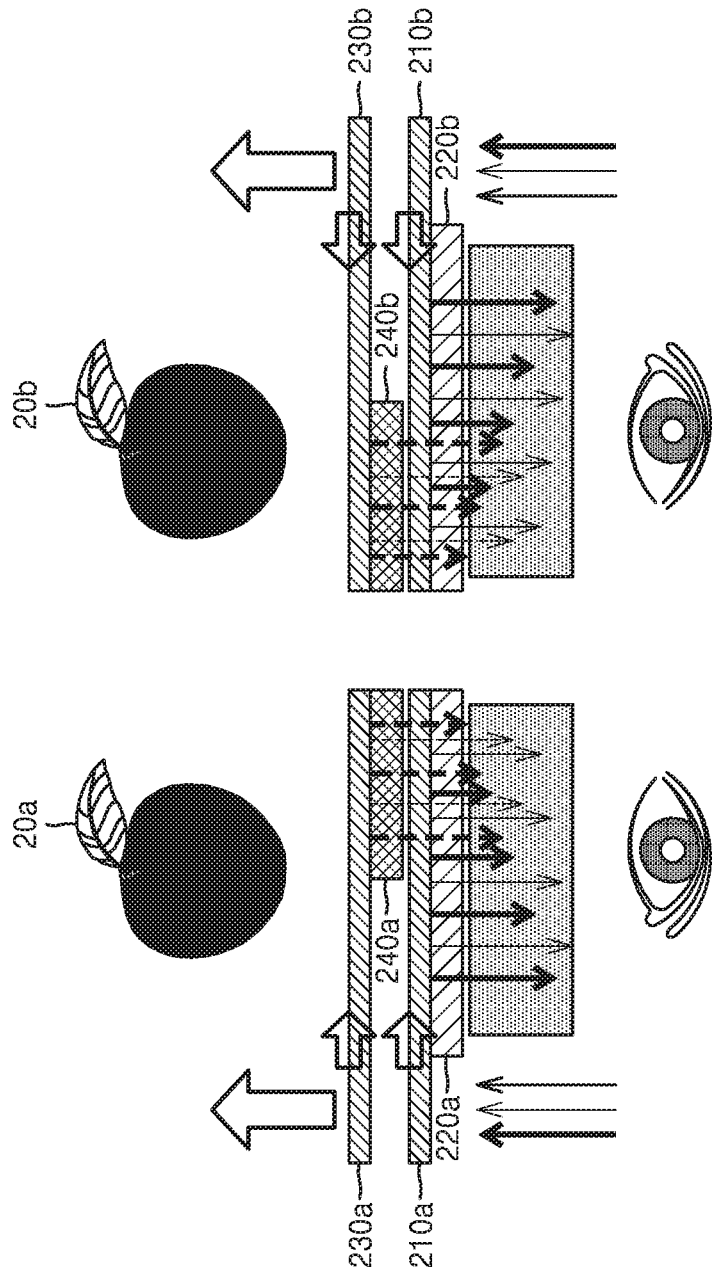
FIG. 2 is a view for describing a method of, performed by an image display apparatus according to an embodiment, controlling a quantity of light diffracted by diffraction gratings positioned on waveguides.

FIG. 2 is a view for describing a method of, performed by an image display apparatus according to an embodiment, controlling a quantity of light diffracted by a plurality of diffraction gratings 220a, 220b, 240a, and 240b positioned on a plurality of waveguides 210a, 210b, 230a, and 230b.

Referring to FIG. 2, light may be irradiated to the waveguides 210a, 210b, 230a, and 230b on which the diffraction gratings 220a, 220b, 240a, and 240b are positioned, so that the light may be recognized by a user's left and right eyes. Herein, the light may be formed from an R image signal, a G image signal, and a B image signal constituting a virtual image. In the current embodiment, for convenience of description, the waveguides 210a, 210b, 230a, and 230b having a stack structure will be referred to as first waveguides 210a and 210b and second waveguides 230a and 230b. Also, the diffraction gratings 220a and 220b positioned on the first waveguides 210a and 210b may be referred to as first diffraction gratings, and the diffraction gratings 240a and 240b positioned on the second waveguides 230a and 230b may be referred to as second diffraction gratings.

In the current embodiment, for example, the first diffraction gratings 220a and 220b may selectively diffract light generated by an R image signal, and the second diffraction gratings 240a and 240b may selectively diffract light generated by a G image signal. The quantity of light diffracted by the first diffraction gratings 220a and 220b may decrease as the distance from the point of incidence of the light on the corresponding first waveguides 210a and 210b increases.

Meanwhile, the image display apparatus according to an embodiment may determine a shape (i.e., a diffraction pattern) of the second diffraction gratings 240a and 240b for compensating for a reduced quantity of light at areas where the quantity of light diffracted by the first diffraction gratings 220a and 220b is reduced. For example, when a quantity of light diffracted at an area spaced a predetermined distance from a first point close to a point at which light is incident to the first diffraction gratings 220a and 220b is smaller by a quantity x of light than a quantity of light diffracted at the first point, the image display apparatus may determine a shape of the second diffraction gratings 240a and 240b such that the quantity x of light is diffracted by the second diffraction gratings 240a and 240b at a location corresponding to the area. In other words, the shape of the second diffraction gratings 240a and 240b may be controlled to compensate for the positional variation in quantity of light diffracted by the first diffraction gratings 220a and 220b. The image display apparatus may apply an electrical signal corresponding to the determined shape of the second diffraction gratings 240a and 240b to the second diffraction gratings 240a and 240b to change the shape of the second diffraction gratings 240a and 240b.

When the quantity of light diffracted by the first diffraction gratings 220a and 220b is non-uniform, the image display apparatus according to an embodiment may compensate for the non-uniform quantity of light by controlling the shape of the second diffraction gratings 240a and 240b so that the color of a virtual image may be recognized uniformly by a user's left and right eyes. Accordingly, unlike the embodiment described above with reference to FIG. 1, the user may recognize the entire of apple images 20a and 20b as a uniform red color through his/her left and right eyes.

Figure 3:
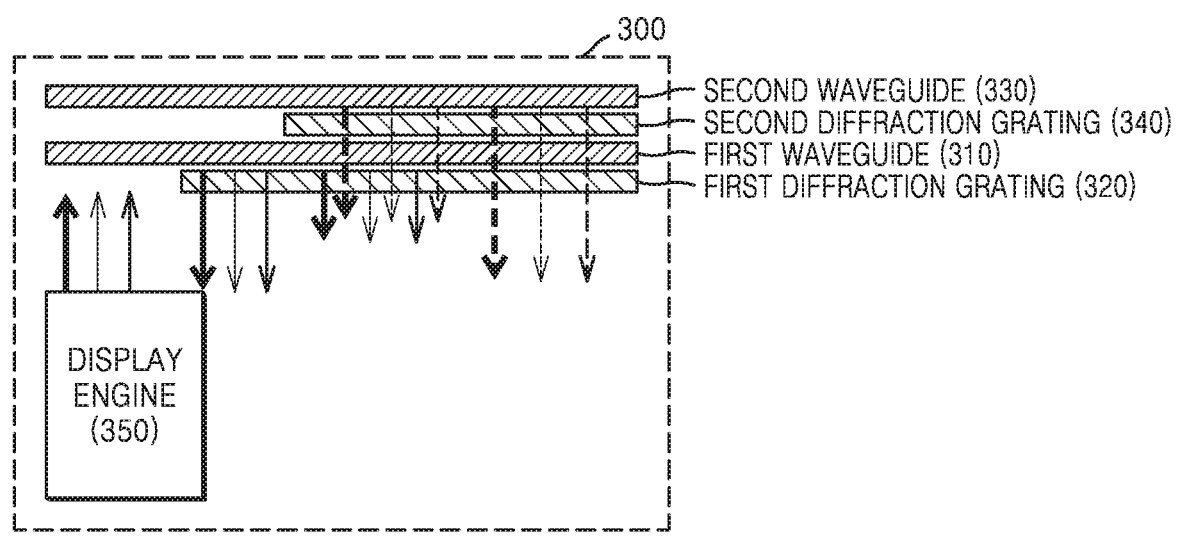
FIG. 3 is a view for describing a structure of an image display apparatus according to an embodiment.

FIG. 3 is a view for describing a structure of an image display apparatus 300 according to an embodiment.

Referring to FIG. 3, the image display apparatus 300 may include a first waveguide 310, a first diffraction grating 320, a second waveguide 330, a second diffraction grating 340, and a display engine 350. However, the configuration of the image display apparatus 300 is an example. That is, the image display apparatus 300 may further include other components in addition to the above-mentioned components, or omit some of the above-mentioned components.

According to an embodiment of the disclosure, the first waveguide 310 and the second waveguide 330 may have a stack structure. In other words, as shown in FIG. 3, the second waveguide 330 may be stacked on the first waveguide 310. Also, the first waveguide 310 and the second waveguide 330 may receive light formed by an R image signal, a G image signal, and a B image signal constituting a virtual image from the display engine 350.

The first diffraction grating 320 may be positioned on the first waveguide 310 to diffract at least a part of light received by the first waveguide 310. Also, the second diffraction grating 340 may be positioned on the second waveguide 330 to diffract at least a part of light received by the second waveguide 330.

Meanwhile, the second diffraction grating 340 may be an active device whose shape may change according to an electrical signal received from the display engine 350. For example, the second diffraction grating 340 may include at least one of a liquid crystal (LC) plate, an LC lens, or an active diffracting device.

The display engine 350 according to an embodiment may control the shape of the second diffraction grating 340 according to a quantity of light diffracted by the first diffraction grating 320. For example, the display engine 350 may determine at least one of a pattern or length of the second diffraction grating 340 according to a quantity of light diffracted by the first diffraction grating 320.

A process of, performed by the display engine 350, controlling the shape of the second diffraction grating 340 will be described in detail, as follows. The display engine 350 may determine quantities of light diffracted by the first diffraction grating 320 according to areas of the first diffraction grating 320, before determining the shape of the second diffraction grating 340. In other words, the display engine 350 may detect the quantity of light diffracted by the first diffraction grating 320 at various positions along the first diffraction grating 320. Also, the display engine 350 may determine a shape of the second diffraction grating 340 for compensating for a quantity of light diffracted by the first diffraction grating 320 such that the quantity of light diffracted in the image display apparatus 300 and reaching the user's eyes is uniform. The display engine 350 may apply an electrical signal corresponding to the determined shape of the second diffraction grating 340 to the second diffraction grating 340.

Meanwhile, according to another embodiment, the display engine 350 may determine a color of a real-world image sensed by the image display apparatus 300, and control a shape of the second diffraction grating 340 according to the determined color and the quantity of light diffracted by the first diffraction grating 320. According to an example, the display engine 350 may determine a wavelength of light that is to be diffracted by the second diffraction grating 340 as corresponding to a color of a real-world image. For example, when a color of a real-world image is determined as a reddish color, the display engine 350 may determine that diffracting a wavelength λ2 of a virtual image may be more effective in recognizing a reddish component in the virtual image than typically diffracting a wavelength λ1, to enable a user to recognize an R image signal of the virtual image more clearly. Therefore, the display engine 350 may determine a shape of the second diffraction grating 340 to selectively diffract light corresponding to the wavelength λ2 among received light instead of the wavelength λ1 so that the user may more clearly recognize the red virtual image when the real-world image is also a reddish color. Also, the display engine 350 may determine a quantity of the wavelength λ2 that is to be diffracted by each area of the second diffraction grating 340, according to the quantity of light diffracted by the first diffraction grating 320.

That is, the display engine 350 may control a shape of the second diffraction grating 340 according to the determined quantity of light and the determined wavelength of light.

According to another embodiment, the display engine 350 may determine a kind of an application that is currently being executed on the image display apparatus 300 to cause a virtual image to be displayed. The display engine 350 may control a shape of the second diffraction grating 340 according to the determined kind of the application and the quantity of light diffracted by the first diffraction grating 320.

For example, a video play application may require relatively higher brightness than a navigation application. Accordingly, when the video play application is executed, the display engine 350 may control a shape of the second diffraction grating 340 to diffract a relatively large quantity of light. Also, the navigation application may require relatively low brightness. Therefore, when the navigation application is executed, the display engine 350 may control a shape of the second diffraction grating 340 to diffract a relatively small quantity of light.

Figure 4:
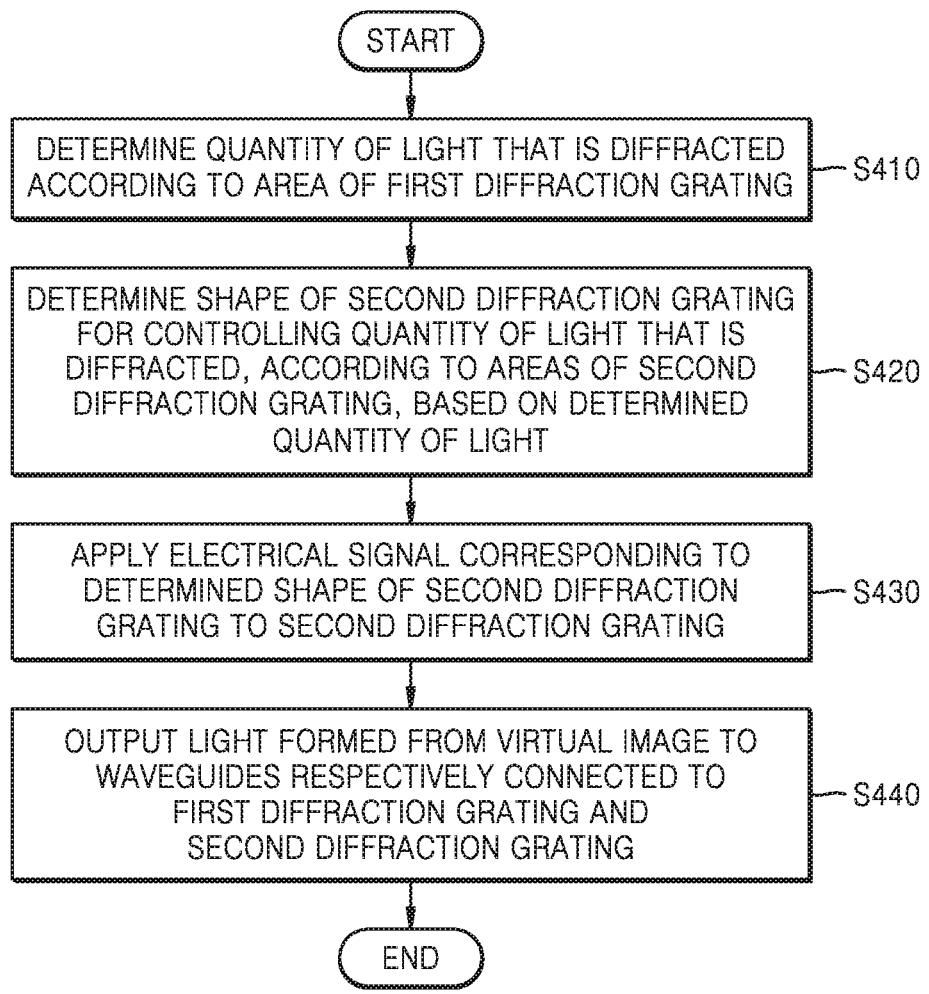
FIG. 4 is a flowchart for describing an image display method according to an embodiment.

FIG. 4 is a flowchart for describing an image display method according to an embodiment.

In operation S410, an image display apparatus may determine a quantity of light that is diffracted according to an area of a first diffraction grating positioned on a first waveguide among a plurality of waveguides of a stack structure. For example, because a quantity of light diffracted by the first diffraction grating is reduced at a more distant area from a point at which the light is incident, the image display apparatus may determine a quantity of light that is diffracted according to an area of the first diffraction grating from the point at which the light is incident. In other words, the image display apparatus may determine a relationship between a quantity of light diffracted by the first diffraction grating and a distance from a point of incidence on the first waveguide.

In operation S420, the image display apparatus may determine a shape of a second diffraction grating for controlling a quantity of light that is diffracted, according to areas of the second diffraction grating positioned on a second waveguide stacked on one surface of the first waveguide, based on the determined quantity of light. In other words, the image display apparatus may determine a shape of the second diffraction grating that compensates for the varied quantity of light diffracted by the first diffraction grating.

According to an embodiment, the image display apparatus may determine a shape of the second diffraction grating for diffracting light at an area of the second diffraction grating corresponding to an area of the first diffraction grating where the quantity of light is reduced, to compensate for the reduced quantity of light at the area of the first diffraction grating. At this time, the image display apparatus may determine the shape of the second diffraction grating such that a sum of quantities of light respectively diffracted by the first diffraction grating and the second diffraction grating is uniform throughout the entire areas of the first and second diffraction gratings. For example, when a quantity of light diffracted at a first area of the first diffraction grating is a and a quantity of light diffracted at a second area of the first diffraction grating is a/2, the image display apparatus may determine a shape of the second diffraction grating such that a quantity of light diffracted at an area of the second diffraction grating corresponding to the second area of the first diffraction grating becomes a/2. Thus, the total quantity of light diffracted by the second areas becomes a, which is the same as the total quantity of light diffracted by the first areas.

In operation S430, the image display apparatus may apply an electrical signal corresponding to the determined shape of the second diffraction grating to the second diffraction grating. The second diffraction grating may be one of various active devices whose shapes change when receiving an electrical signal.

In operation S440, the image display apparatus may output light formed from an R image signal, a G image signal, and a B image signal constituting a virtual image to the first waveguide and the second waveguide. The image display apparatus may change a pattern of the second diffraction grating such that an electrical signal is applied to emit a uniform quantity of light, and then may emit the light.

Figure 5:
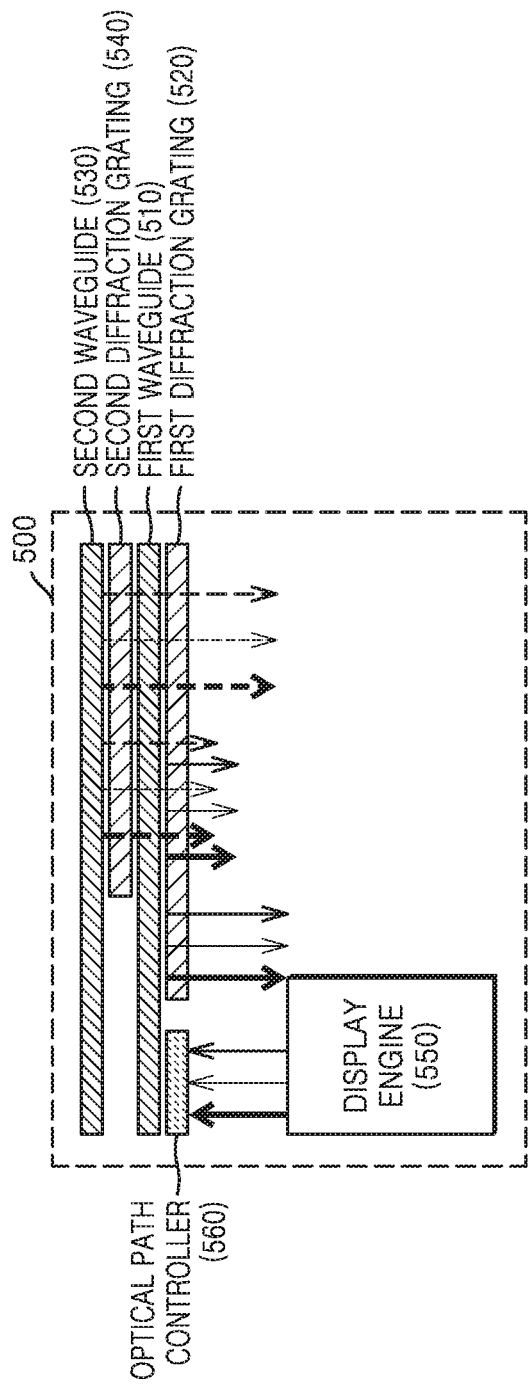
FIG. 5 is a view for describing a structure of an image display apparatus according to an embodiment.

FIG. 5 is a view for describing a structure of an image display apparatus 500 according to another embodiment.

Referring to FIG. 5, the image display apparatus 500 may include a first waveguide 510, a first diffraction grating 520, a second waveguide 530, a second diffraction grating 540, a display engine 550, and an optical path controller 560. However, the configuration of the image display apparatus 500 is an example. That is, the image display apparatus 500 may further include other components in addition to the above-mentioned components, or omit some of the above-mentioned components.

In the current embodiment of the disclosure, the first waveguide 510, the first diffraction grating 520, the second waveguide 530, the second diffraction grating 540, and the display engine 550 may respectively correspond to the first waveguide 310, the first diffraction grating 320, the second waveguide 330, the second diffraction grating 340, and the display engine 350 described above with reference to FIG. 3. Accordingly, descriptions previously given with reference to FIG. 3 will be omitted.

The display engine 550 may determine a pattern of the second diffraction grating 540 for compensating for an area of the first diffraction grating 520 where a quantity of light is reduced, so that the image display apparatus 500 emits a uniform quantity of light. Also, the display engine 550 may apply an electrical signal corresponding to the determined pattern of the second diffraction grating 540 to the second diffraction grating 540.

Meanwhile, the display engine 550 may output light formed from an R image signal, a G image signal, and a B image signal constituting a virtual image to the optical path controller 560.

The optical path controller 560 may control a path of light received from the display engine 550 to increase quantities of light that are incident to the first waveguide 510 and the second waveguide 530, respectively, while satisfying a total reflection condition. The optical path controller 560 may include at least one of, for example, a half mirror, a full mirror, or a liquid crystal lens to direct the light emitted by the display engine 550 toward the first waveguide 510 and the second waveguide 530.

Light that is incident to the first waveguide 510 and the second waveguide 530 from the optical path controller 560 may be diffracted by the first diffraction grating 520 and the second diffraction grating 540 to be recognized by a user's retinas.

Figure 6:
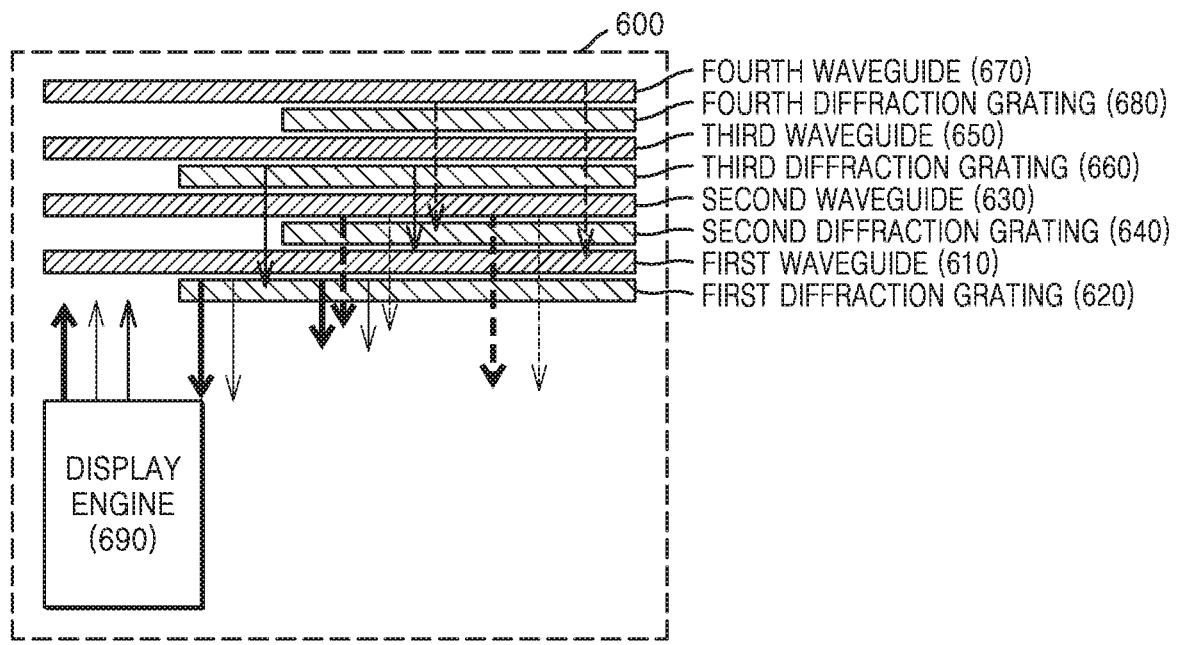
FIG. 6 is a view for describing a structure of an image display apparatus according to an embodiment.

FIG. 6 is a view for describing a structure of an image display apparatus 600 according to another embodiment.

Referring to FIG. 6, the image display apparatus 600 may include a first waveguide 610, a first diffraction grating 620, a second waveguide 630, a second diffraction grating 640, a third waveguide 650, a third diffraction grating 660, a fourth waveguide 670, a fourth diffraction grating 680, and a display engine 690. However, the configuration of the image display apparatus 600 is an example. That is, the image display apparatus 600 may further include other components in addition to the above-mentioned components, or omit some of the above-mentioned components.

According to an embodiment, the first waveguide 610, the second waveguide 630, the third waveguide 650, and the fourth waveguide 670 may have a stack structure. Each of the first waveguide 610, the second waveguide 630, the third waveguide 650, and the fourth waveguide 670 may receive light formed by an R image signal, a G image signal, and a B image signal constituting a virtual image from the display engine 690.

The first diffraction grating 620 may be positioned on the first waveguide 610 to diffract at least a part of light formed by an R image signal and a G image signal among light received by the first waveguide 610. The first diffraction grating 620 may thus transmit light formed by a B image signal. Also, the second diffraction grating 640 may be positioned on the second waveguide 630 to diffract at least a part of light formed by an R image signal and a G image signal among light received by the second waveguide 630. The second diffraction grating 640 may thus transmit light formed by a B image signal. Also, the second diffraction grating 640 may be an active device whose shape changes according to an electrical signal applied from the display engine 690.

The display engine 690 may determine a shape of the second diffraction grating 640 for compensating for a quantity of light diffracted by the first diffraction grating 620. The quantity of light of an R image signal and a G image signal diffracted in the image display apparatus 600 may thus be controlled to be uniform. The display engine 690 may apply an electrical signal corresponding to the determined shape of the second diffraction grating 640 to the second diffraction grating 640.

Meanwhile, the third diffraction grating 660 may be positioned on the third waveguide 650 to diffract at least a part of light formed by a B image signal among light received by the third waveguide 650. The third diffraction grating 660 may thus transmit light formed by an R image signal and a G image signal. Also, the fourth diffraction grating 680 may be positioned on the fourth waveguide 670 to diffract at least a part of light formed by a B image signal among light received by the fourth waveguide 670. The fourth diffraction grating 680 may thus transmit light formed by an R image signal and a G image signal. Also, the fourth diffraction grating 680 may be an active device whose shape changes according to an electrical signal applied from the display engine 690.

The display engine 690 may determine a shape of the fourth diffraction grating 680 for compensating for a quantity of light diffracted by the third diffraction grating 660 such that the quantity of light of a B image signal diffracted in the image display apparatus 600 is uniform. The display engine 690 may apply an electrical signal corresponding to the determined shape of the fourth diffraction grating 680 to the fourth diffraction grating 680. In other words, the third and fourth diffraction gratings 660 and 680 may be configured to perform the same function for the B signal as is performed by the first and second diffraction gratings 620 and 640 for the R and G signals.

Meanwhile, the waveguides 610, 630, 650, and 670 of the image display apparatus 600 are not limited to the stack structure shown in FIG. 6. According to another example, when each waveguide is configured to selectively diffract only one of light formed by an R image signal, a G image signal, and a B image signal, six waveguides of a stack structure may be included in an image display apparatus. In this case, six diffraction gratings may be respectively positioned on the six waveguides, and three diffraction gratings among the diffraction gratings may be configured as active devices for compensating for the quantities of light diffracted by the remaining three diffraction gratings.

Figure 7:
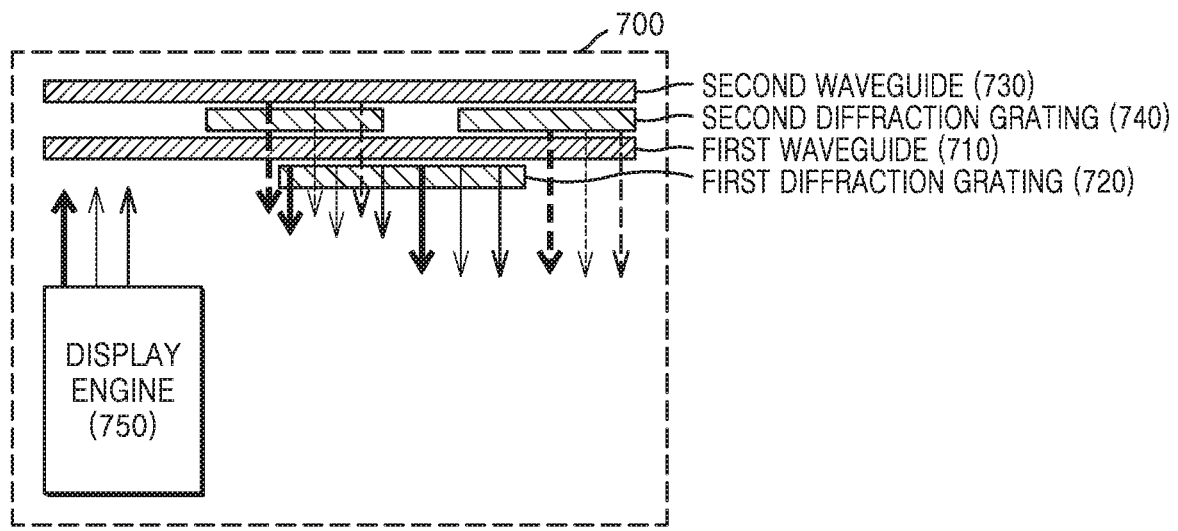
FIG. 7 is a view for describing an example of a shape of a second diffraction grating included in an image display apparatus according to an embodiment.

FIG. 7 is a view for describing an example of a shape of a second diffraction grating 740 included in an image display apparatus 700 according to an embodiment.

Referring to FIG. 7, an image display apparatus 700 may include a first waveguide 710, a first diffraction grating 720, a second waveguide 730, a second diffraction grating 740, and a display engine 750. The first waveguide 710, the first diffraction grating 720, the second waveguide 730, the second diffraction grating 740, and the display engine 750 may respectively correspond to the first waveguide 310, the first diffraction grating 320, the second waveguide 330, the second diffraction grating 340, and the display engine 350 described above with reference to FIG. 3. As shown in FIG. 7, the first diffraction grating 720 does not extend to an end of the first waveguide 710 opposite to a point of incidence of light emitted by the display engine 750. Thus, no light is diffracted by the first diffraction grating 720 in a region most distant from the point of incidence. On the other hand, a gap exists in a middle region of the second diffraction grating 740 such that no light is diffracted by the second diffraction grating 740 in this region.

The display engine 750 may control a shape of the second diffraction grating 740 according to a quantity of light diffracted by the first diffraction grating 720. For example, at areas close to both ends of the first diffraction grating 720 (i.e., at an end portion of the first diffraction grating 720), a quantity of diffracted light may be reduced. In this case, the display engine 750 may determine a shape of the second diffraction grating 740 positioned on the second waveguide 730 to diffract light at areas of the second diffraction grating 740 corresponding to both ends of the first diffraction grating 720, as shown in FIG. 7.

Figure 8:
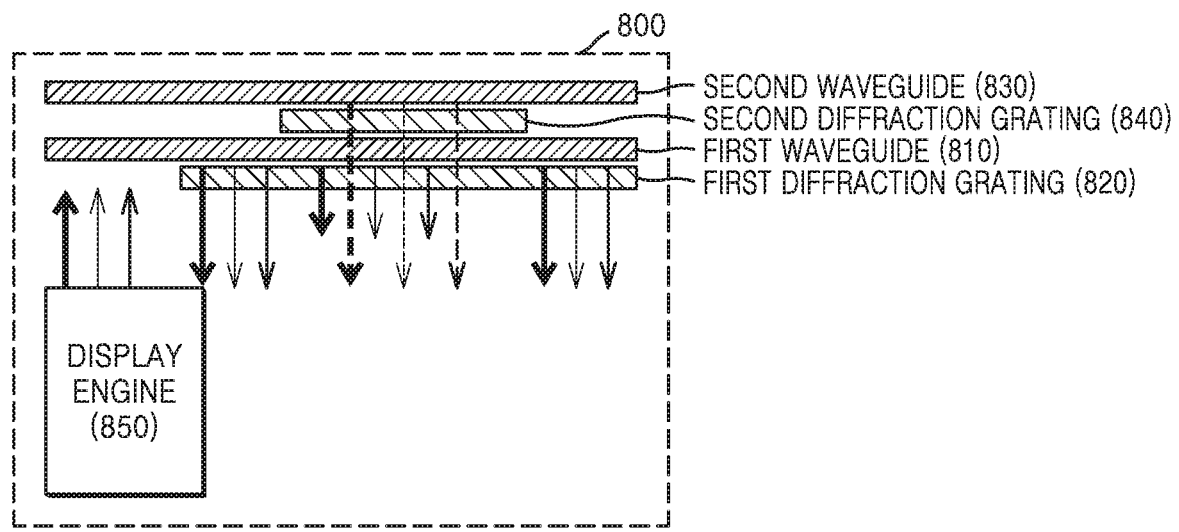
FIG. 8 is a view for describing an example of a shape of a second diffraction grating included in an image display apparatus according to an embodiment.

FIG. 8 is a view for describing an example of a shape of a second diffraction grating 840 included in an image display apparatus 800 according to an embodiment.

Referring to FIG. 8, the image display apparatus 800 may include a first waveguide 810, a first diffraction grating 820, a second waveguide 830, a second diffraction grating 840, and a display engine 850. The first waveguide 810, the first diffraction grating 820, the second waveguide 830, the second diffraction grating 840, and the display engine 850 may respectively correspond to the first waveguide 310, the first diffraction grating 320, the second waveguide 330, the second diffraction grating 340, and the display engine 350 described above with reference to FIG. 3. As shown in FIG. 8, the second diffraction grating 840 does not extend to an end of the second waveguide 830 opposite to a point of incidence of light emitted by the display engine 850. Further, the second diffraction grating 840 does not extend to an end of the first diffraction grating 820 closest to the point of incidence. Thus, no light is diffracted by the second diffraction grating 840 in these regions.

The display engine 850 may control a shape of the second diffraction grating 840 according to a quantity of light diffracted by the first diffraction grating 820. For example, a quantity of diffracted light may be reduced around a center area of the first diffraction grating 820 (i.e., at a middle portion of the first diffraction grating 820). In this case, the display engine 850 may determine a shape of the second diffraction grating 840 positioned on the second waveguide 830 to diffract light at an area of the second diffraction grating 840 corresponding to the center area of the first diffraction grating 820, as shown in FIG. 8.

Figure 9:
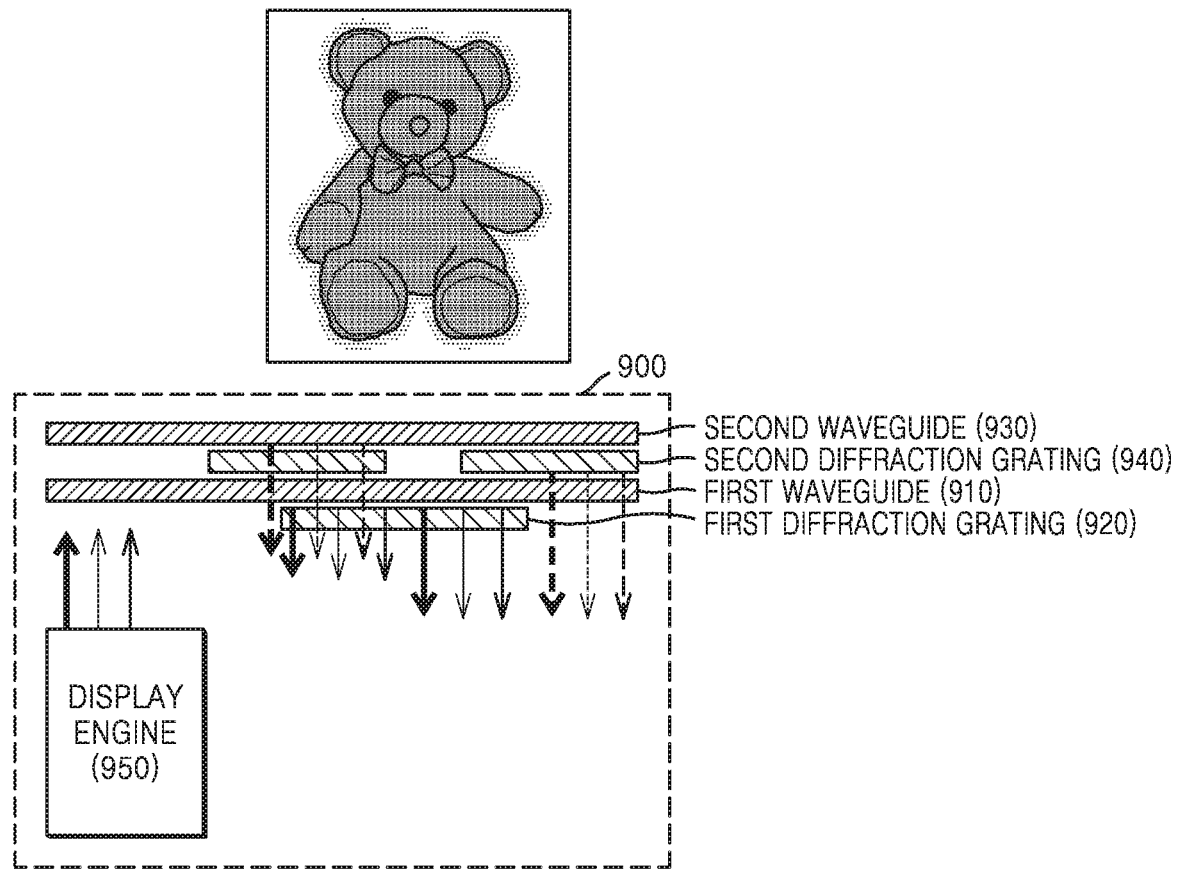
FIG. 9 is a view for describing a method of, performed by an image display apparatus according to an embodiment, controlling an output of light by considering the characteristics of an object included in a virtual image.

FIG. 9 is a view for describing a method of, performed by an image display apparatus 900 according to an embodiment, controlling an output of light by considering the characteristics of an object included in a virtual image.

Referring to FIG. 9, the image display apparatus 900 may include a first waveguide 910, a first diffraction grating 920, a second waveguide 930, a second diffraction grating 940, and a display engine 950. The first waveguide 910, the first diffraction grating 920, the second waveguide 930, the second diffraction grating 940, and the display engine 950 may respectively correspond to the first waveguide 310, the first diffraction grating 320, the second waveguide 330, the second diffraction grating 340, and the display engine 350 described above with reference to FIG. 3. As shown in FIG. 9, the first diffraction grating 920 does not extend to an end of the first waveguide 910 opposite to a point of incidence of light emitted by the display engine 950. Thus, no light is diffracted by the first diffraction grating 920 in a region most distant from the point of incidence. On the other hand, a gap exists in a middle region of the second diffraction grating 940 such that no light is diffracted by the second diffraction grating 940 in this region.

The display engine 950 may output light forming a virtual image including an object. The display engine 950 according to an embodiment of the disclosure may change a shape of the second diffraction grating 940 to control brightness of an area including the object or an area around the object. Herein, the object may be a thing, a human, an animal, etc. In the current embodiment, a teddy bear will be described as an example of the object.

When a virtual image including a teddy bear is output, the display engine 950 may control a shape of the second diffraction grating 940 to output relatively high brightness at an area around the teddy bear. For example, the display engine 950 may determine a shape of the second diffraction grating 940 to diffract a relatively large quantity of light at an area of the second diffraction grating 940 corresponding to an outline area of the teddy bear.

The display engine 950 may apply an electrical signal to the second diffraction grating 940 according to the determined shape of the second diffraction grating 940.

Figure 10:
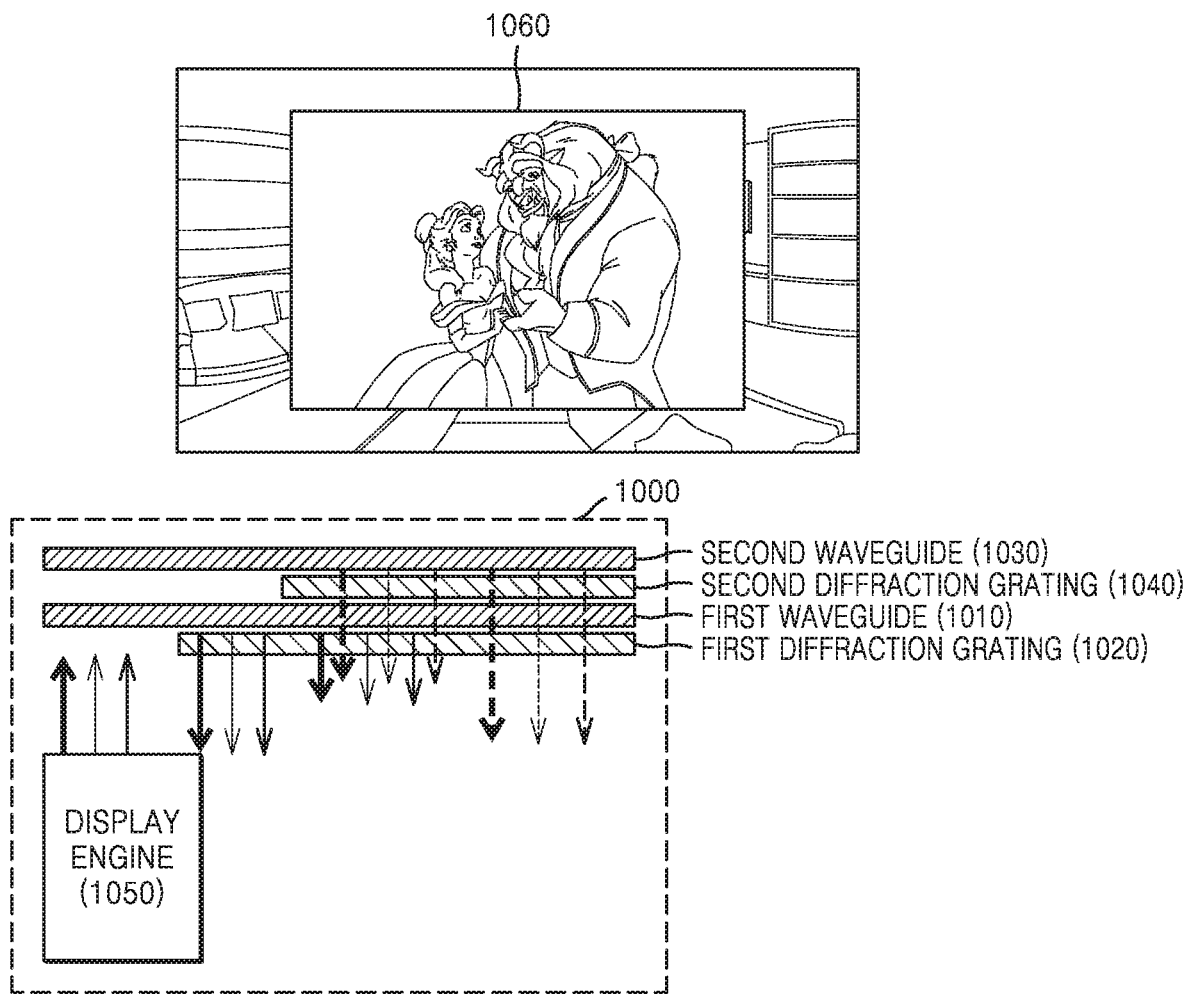
FIG. 10 is a view for describing an example of, performed by an image display apparatus according to an embodiment, controlling an output of light by considering a kind of an application that is executed.

FIG. 10 is a view for describing an example of, performed by an image display apparatus 1000 according to an embodiment, controlling an output of light by considering a kind of an application that is executed.

Referring to FIG. 10, an image display apparatus 1000 may include a first waveguide 1010, a first diffraction grating 1020, a second waveguide 1030, a second diffraction grating 1040, and a display engine 1050. The first waveguide 1010, the first diffraction grating 1020, the second waveguide 1030, the second diffraction grating 1040, and the display engine 1050 may respectively correspond to the first waveguide 310, the first diffraction grating 320, the second waveguide 330, the second diffraction grating 340, and the display engine 350 described above with reference to FIG. 3. As shown in FIG. 10, the second diffraction grating 1040 does not extend to an end of the first diffraction grating 1020 closest to the point of incidence. Thus, no light is diffracted by the second diffraction grating 1040 in this region.

Meanwhile, in the current embodiment of the disclosure, it is assumed that a video play application is executed on the image display apparatus 1000.

The display engine 1050 may determine a kind of an application being executed on the image display apparatus 1000. For example, the display engine 1050 may determine that an application being executed on the image display apparatus 1000 is a video play application.

The video play application may require an output of a virtual image of high brightness to increase a user's concentration on the video being played. Accordingly, the display engine 1050 may control a shape of the second diffraction grating 1040 such that a virtual image of brightness that is suitable for the video play application may be recognized by the user's retinas. For example, the display engine 1050 may determine a quantity of light that needs to be diffracted to output a virtual image of brightness that is suitable for the video play application, and determine a shape of the second diffraction grating 1040 according to the determined quantity of light. Also, the display engine 1050 may apply an electrical signal corresponding to the determined shape of the second diffraction grating 1040 to the second diffraction grating 1040 so that the second diffraction grating 1040 changes to the determined shape.

Meanwhile, the display engine 1050 may determine a portion of light that is diffracted by considering a kind of an application, and control an output of light by considering quantities of light that are diffracted according to areas of the first diffraction grating 1020 such that a uniform quantity of light is output to be suitable for the kind of the application.

Figure 11:
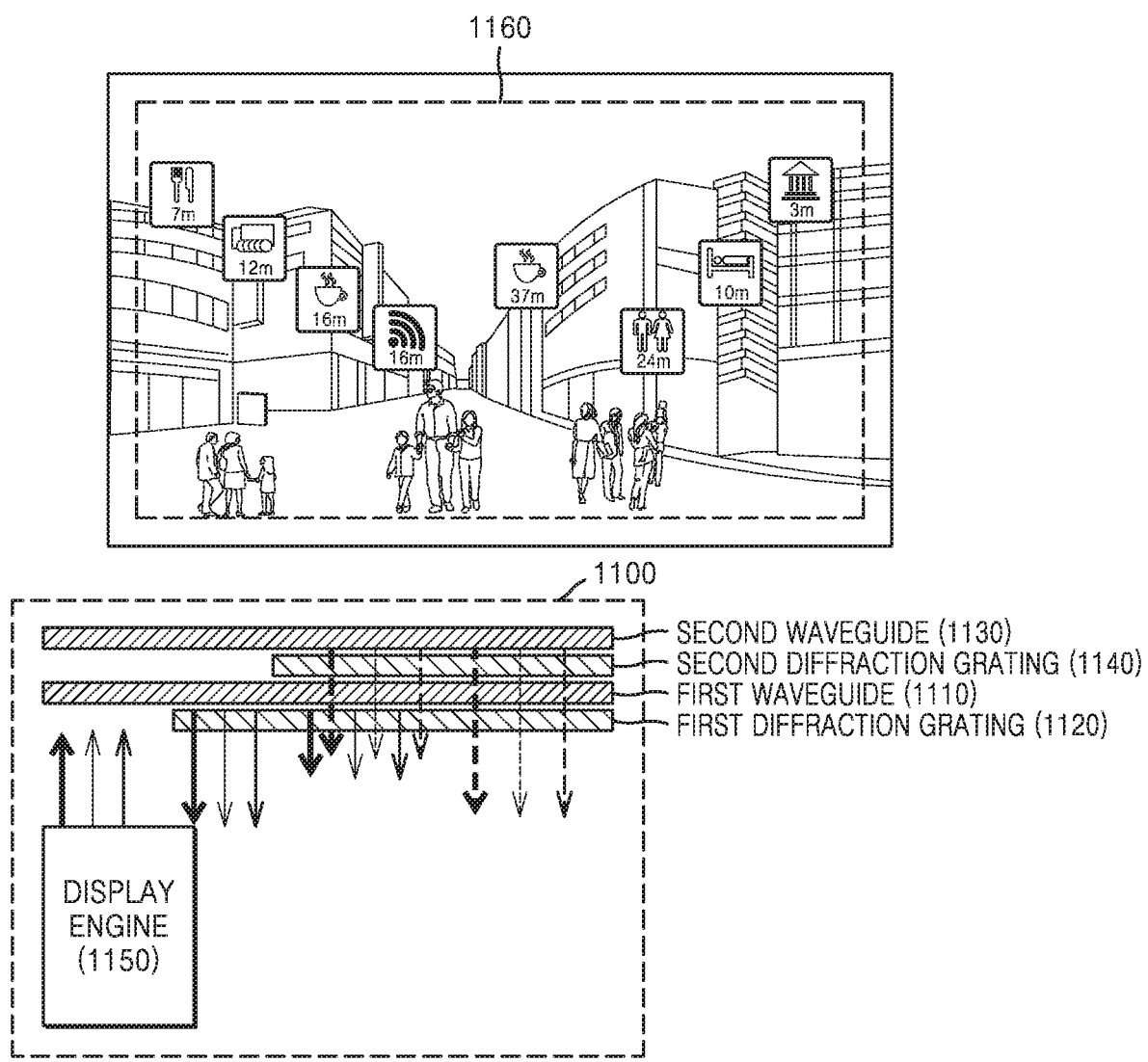
FIG. 11 is a view for describing an example of, performed by an image display apparatus according to an embodiment, controlling an output of light by considering a kind of an application that is executed.

FIG. 11 is a view for describing another example of, performed by an image display apparatus 1100 according to an embodiment, controlling an output of light by considering a kind of an application that is executed.

Referring to FIG. 11, an image display apparatus 1100 may include a first waveguide 1110, a first diffraction grating 1120, a second waveguide 1130, a second diffraction grating 1140, and a display engine 1150. The first waveguide 1110, the first diffraction grating 1120, the second waveguide 1130, the second diffraction grating 1140, and the display engine 1150 may respectively correspond to the first waveguide 310, the first diffraction grating 320, the second waveguide 330, the second diffraction grating 340, and the display engine 350 described above with reference to FIG. 3. As shown in FIG. 11, the second diffraction grating 1140 does not extend to an end of the first diffraction grating 1120 closest to the point of incidence. Thus, no light is diffracted by the second diffraction grating 1140 in this region.

Meanwhile, in the current embodiment of the disclosure, it is assumed that a navigation application is executed on the image display apparatus 1100.

The display engine 1150 may determine a kind of an application being executed on the image display apparatus 1100. For example, the display engine 1150 may determine that an application being executed on the image display apparatus 1100 is a navigation application.

The navigation application may require an output of a virtual image of relatively low brightness because a virtual image overlapping a real-world image needs to be recognized. Accordingly, the display engine 1150 may control a shape of the second diffraction grating 1140 such that a virtual image of brightness suitable for the navigation application may be recognized by a user's retinas. For example, the display engine 1150 may determine a quantity of light that needs to be diffracted to output a virtual image of brightness that is suitable for the navigation application, and determine a shape of the second diffraction grating 1140 according to the determined quantity of light. Also, the display engine 1150 may apply an electrical signal corresponding to the determined shape of the second diffraction grating 1140 to the second diffraction grating 1140 so that the second diffraction grating 1140 changes to the determined shape.

Meanwhile, the display engine 1150 may determine a portion of light that is diffracted by considering a kind of an application, and control an output of light by considering a quantity of light that is diffracted by the first diffraction grating 1120 such that a uniform quantity of light is output to be suitable for the kind of the application.

Methods according to embodiments may be implemented in the form of program commands that can be executed through various computer means, and stored in a computer-readable medium. The computer-readable medium may also include, alone or in combination with the program commands, data files, data structures, and the like. The program commands recorded on the medium may be those specially designed and constructed for the disclosure, or they may be of the kind well-known and available to those having skill in the computer software arts. Examples of the computer-readable medium include: magnetic media such as hard disks, floppy disks, and magnetic tape; optical media such as CD ROMs and DVDs; magneto-optical media such as floptical disks; and hardware devices that are specially configured to store and perform program commands, such as read-only memory (ROM), random access memory (RAM), flash memory, and the like. Examples of the program commands include both machine code, such as produced by a compiler, and higher level code that may be executed by the computer using an interpreter.

In the embodiments shown in the drawings, reference numerals are denoted, and specific terms are used to describe the embodiments, however, the disclosure is not limited by the terms. The embodiments may include all components that can be generally understood by one of ordinary skill in the art.

The embodiments may be represented by functional block configurations and various processing operations. These functional blocks may be implemented by various numbers of hardware or/and software configurations that execute specific functions. For example, the embodiments may adopt integrated circuit configurations, such as a memory, processing, a logic, a look-up table, etc., which can execute various functions by the control of one or more microprocessors or different control apparatuses. Also, the embodiments may adopt the same kind of or different kinds of cores and different kinds of CPUs. Similarly that components are executed by software programming or software elements, the embodiments may be implemented with a programming or scripting language, such as C, C++, Java, assembler, etc., including various algorithms that are realized through combinations of data structures, processes, routines, or other programming structures. Functional aspects may be implemented with an algorithm that is executed by one or more processors. Also, the embodiments may adopt typical technologies for electronic environment settings, signal processing, and/or data processing, etc. The terms "mechanism", "factor", "means", and "configuration" may be widely used, and may be not limited to mechanical and physical configurations. The terms may include the meaning of a series of routines of software interworking with a processor, etc.

Specific executions described in the embodiments are examples, and do not limit the scope of the embodiments even in any method. For conciseness of the specification, descriptions about typical electronic configurations, control systems, software, and other functional aspects of the systems may be omitted. In addition, connection of lines or connection members between the components shown in the drawings illustrate functional connection and/or physical or circuital connections. The connections may be replaced or may be indicated as additional various functional connections, physical connections, or circuit connections in a real apparatus. When there is no detailed mention, such as "essential", "importantly", etc., the corresponding component may be not an absolutely essential component.

In the current specification (particularly, in the claims), the term "said" and the similar directive terms may be used for both the singular and plural forms. Also, the term "range" may include individual values belonging to the "range" (unless the context clearly dictates otherwise). That is, writing a range in the detailed description may be the same as writing individual values constituting the range in the detailed description. Finally, operations constituting the method may be performed in any appropriate order, unless the order of the operations is specified or the context clearly dictates otherwise. That is, the operations may be not necessarily performed in the order in which they are written. So far, example embodiments have been described. However, it will be apparent that those skilled in the art can make various modifications thereto without changing the intrinsic features of the disclosure. Thus, it should be understood that example embodiments described above are merely for illustrative purposes and not for limitation purposes. The scope of the disclosure is defined in the claims rather than the detailed description, and all differences within the equivalent range should be interpreted as belonging to the scope of the disclosure.

What is claimed is:

1. An image display apparatus comprising:
a first waveguide;
a second waveguide positioned at one side of the first waveguide;
a first diffraction grating positioned at an other side of the first waveguide;
a second diffraction grating positioned between the first waveguide and the second waveguide; and
a processor configured to:
identify a quantity of light diffracted from the first diffraction grating, wherein at least a portion of light incident on the first waveguide is diffracted from the first diffraction grating;
obtain information regarding a shape of the second diffraction grating for compensating for the identified quantity of the light diffracted from the first diffraction grating, and
apply, to the second diffraction grating, an electrical signal based on the obtained information regarding the shape of the second diffraction grating.

2. The image display apparatus of claim 1, wherein the quantity of light diffracted from the first diffraction grating is compensated such that a total quantity of light diffracted from the first waveguide and the second waveguide is uniform.

3. The image display apparatus of claim 1, wherein information regarding at least one from among a pattern or a length of the second diffraction grating is obtained according to the quantity of the light diffracted from the first diffraction grating.

4. The image display apparatus of claim 1, wherein the second diffraction grating includes at least one from among a liquid crystal (LC) plate, an LC lens, or an active diffracting device.

5. The image display apparatus of claim 1, further comprising an optical path controller,
wherein a quantity of the light incident on the first waveguide and the second waveguide is controlled through the optical path controller and
the optical path controller includes at least one from among a half mirror, a full mirror, or a liquid crystal lens.

6. The image display apparatus of claim 1, wherein the processor is further configured to:
obtain information regarding a color of light from a real-world image incident on the image display apparatus; and
control the shape of the second diffraction grating according to the information regarding the color and the quantity of the light diffracted from the first diffraction grating.

7. The image display apparatus of claim 1, further comprising:
a third waveguide on which a third diffraction grating is positioned and
a fourth waveguide on which a fourth diffraction grating is positioned,
wherein light formed from at least one image signal from among a red (R) image signal, a green (G) image signal, and a blue (B) image signal constituting a virtual image is selectively diffracted from the first diffraction grating and the second diffraction grating,
light formed from an image signal other than the at least one image signal from among the R image signal, the G image signal, and the B image signal is diffracted from the third diffraction grating, and
information regarding a shape of the fourth diffraction grating is obtained according to characteristics of light diffracted from the third diffraction grating.

8. The image display apparatus of claim 1, wherein the processor is further configured to:
identify an application that is being executed in the image display apparatus, and
control the shape of the second diffraction grating according to the identified application and the quantity of the light diffracted from the first diffraction grating.

9. An image display method comprising:
obtaining information regarding a quantity of light diffracted from a first diffraction grating, wherein at least a portion of light incident on a first waveguide is diffracted from the first diffraction grating;
obtaining information regarding a shape of a second diffraction grating for compensating for the identified quantity of the light diffracted from the first diffraction grating, wherein the second diffraction grating positioned between the first waveguide and a second waveguide and the first diffraction grating is positioned at an other side of the first waveguide from the second diffraction grating; and
applying, to the second diffraction grating, an electrical signal based on the obtained information regarding the shape of the second diffraction grating.

10. The method of claim 9, wherein the quantity of light diffracted from the first diffraction grating is compensated such that a total quantity of light diffracted from the first waveguide and the second waveguide is uniform.

11. The method of claim 9, wherein information regarding at least one from among a pattern or a length of the second diffraction grating is obtained according to the quantity of light diffracted from the first diffraction grating.

12. The method of claim 9, wherein the second diffraction grating includes at least one from among a liquid crystal (LC) plate, an LC lens, or an active diffracting device.

13. The method of claim 9, further comprising obtaining information regarding a color of light from a real-world image to be displayed,
wherein obtaining information regarding the shape of the second diffraction grating comprises obtaining information regarding the shape of the second diffraction grating according to the determined color and the quantity of light diffracted from the first diffraction grating.

14. The method of claim 9, wherein light formed from at least one image signal from among a red (R) image signal, a green (G) image signal, and a blue (B) image signal constituting the virtual image is selectively diffracted from the first diffraction grating and the second diffraction grating, light formed from an image signal other than the at least one image signal from among the R image signal, the G image signal, and the B image signal is diffracted from a third diffraction grating, and
information regarding a shape of a fourth diffraction grating is obtained according to characteristics of light diffracted from the third diffraction grating.

15. The method of claim 9, further comprising identifying an application that is being executed,
wherein the obtaining information regarding the shape of the second diffraction grating comprises obtaining information regarding the shape of the second diffraction grating according to the identified application and the quantity of light diffracted from the first diffraction grating.

* * * * *